(12) United States Patent
Yavid

(10) Patent No.: US 7,059,523 B1
(45) Date of Patent: Jun. 13, 2006

(54) SCAN LINE ALIGNMENT IN RASTER PATTERN

(75) Inventor: Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/116,646

(22) Filed: Apr. 28, 2005

(51) Int. Cl.
*G06K 7/10* (2006.01)
*G06K 7/14* (2006.01)

(52) U.S. Cl. ..................................... 235/454
(58) Field of Classification Search ............... 235/435, 235/454
See application file for complete search history.

(56) References Cited

U.S. PATENT DOCUMENTS 5,404,175 A * 4/1995 Nagae et al. ............... 348/751

\* cited by examiner

*Primary Examiner*—Thien M. Le
*Assistant Examiner*—Lisa M. Caputo
(74) *Attorney, Agent, or Firm*—Kirschstein, et al.

(57) ABSTRACT

A lightweight, compact image projection module, especially for mounting in a housing having a light-transmissive window, is operative for causing selected pixels in a raster pattern to be illuminated to produce an image of high resolution of VGA quality in color. A data signal on a pattern of odd and even scan lines in the pattern is synchronized with movement of a scan mirror operative to sweep a light beam along each scan line to align all the scan lines.

14 Claims, 8 Drawing Sheets

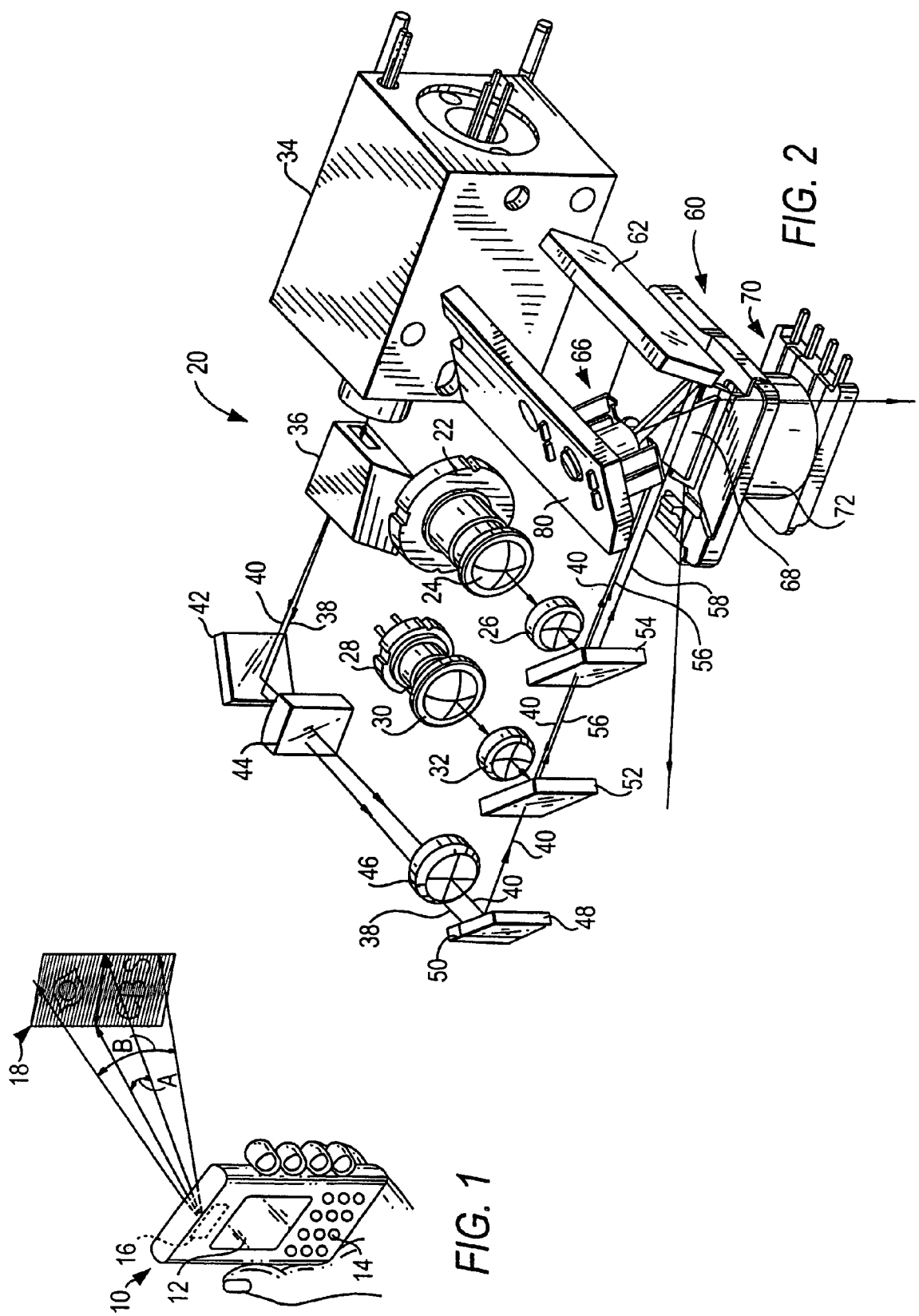

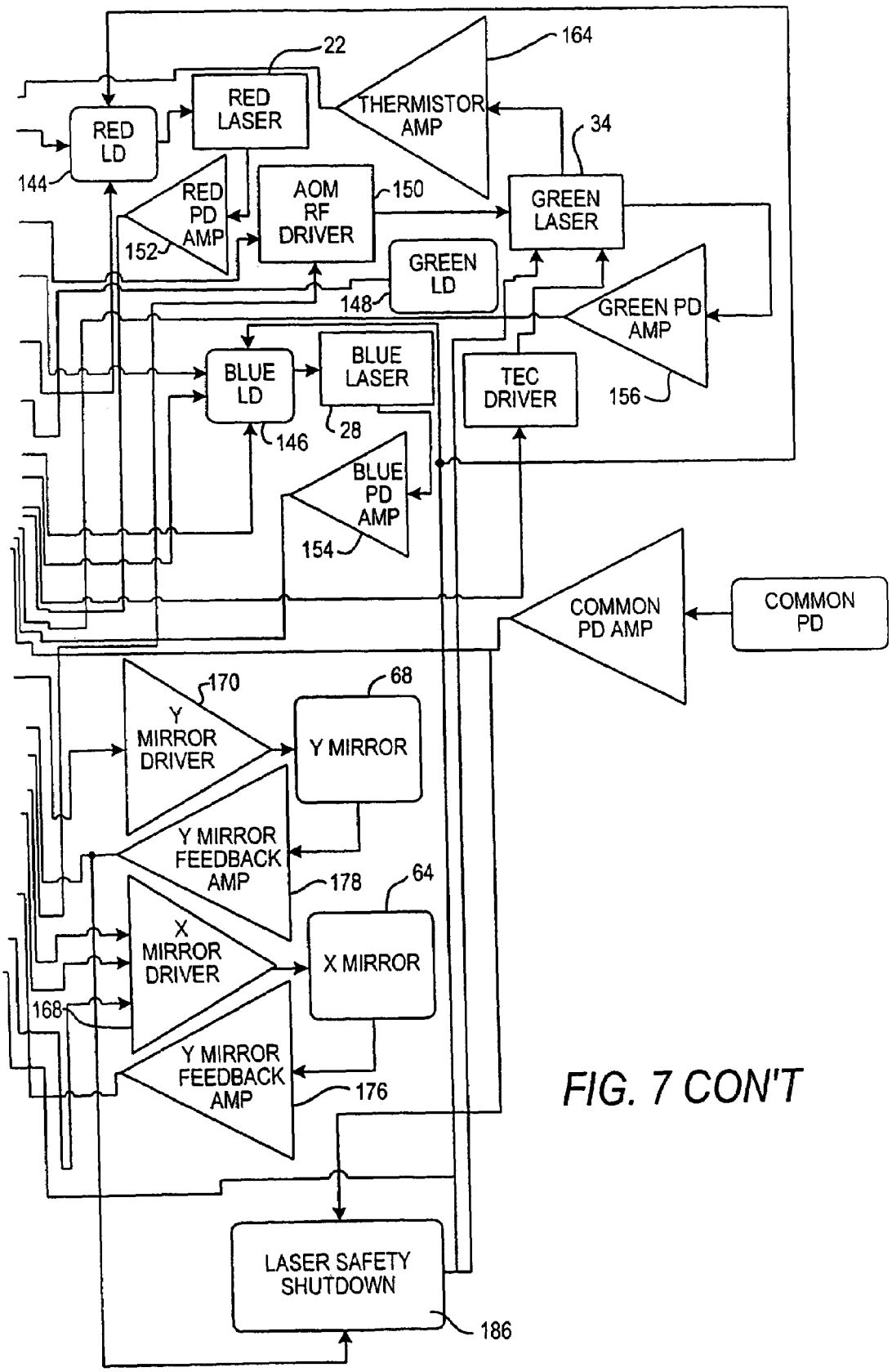
FIG. 7 CON'T

SCAN LINE ALIGNMENT IN RASTER PATTERN

BACKGROUND OF THE INVENTION

1. Field of the Invention

The present invention generally relates to scan line alignment in a raster pattern and to an arrangement for, and a method of, synchronizing a data signal on a pattern of odd and even scan lines with movement of a scan mirror operative for sweeping a light beam along each scan line, especially for use in a color image projection system operative for projecting a two-dimensional image in color while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to sweep a laser beam over a raster pattern consisting of odd scan lines, for example, swept from left-to-right across the screen, and even scan lines, for example, swept from right-to-left across the screen. Each scan line has a number of pixels. A laser for emitting the laser beam is energized by a processor in response to a video signal to cause selected pixels to be illuminated, and rendered visible, to produce the image on the screen for viewing. However, the known image projection systems project the image with limited resolution, typically less than a fourth of video-graphics-array (VGA) quality of 640×480 pixels, and often suffer from misalignment among the scan lines which produces images offset from one another.

To maximize the brightness of the projected image, both the odd and even scan lines carry the video signal, that is, the image is constructed from video data on both the odd and even scan lines. Each adjacent pair of odd and even scan lines must be aligned with each other to prevent the formation of offset images. To assure such convergence or alignment between each adjacent pair of odd and even scan lines, near perfect synchronization, typically less than 0.01% accuracy, must be maintained between the video signal and the motion of the scan mirror responsible for sweeping the laser beam along each scan line.

The art has proposed various position or velocity feedback circuits to attempt to provide such a high absolute accuracy. Piezoelectric transducers have been suggested to detect the motion of the scan mirror. Also, a permanent magnet has been mounted on the scan mirror in proximity to an electromagnetic coil in order to generate a feedback signal indicative of the motion of the scan mirror. Optical light emitters and light detectors, as well as capacitive sensors, have also been proposed.

Experience has shown, however, that the known feedback circuits are not altogether satisfactory. Inevitably, there is misalignment among the scan lines which must be corrected, typically by a calibration procedure, in which the image is observed, for example by human or machine vision, and then the mirror drive is adjusted until the scan lines are aligned. Unfortunately, this calibration does not accommodate changes in temperature and ageing of the circuit components and, hence, must be repeated from time to time, a procedure which a consumer may likely be unwilling to perform.

Certain electro-optical readers for electro-optically reading a spatial pattern of graphic indicia, for example, a two-dimensional symbol, also sweep a laser beam as a raster pattern of scan lines by moving a scan mirror. It is desirable for each scan line, whether swept from left-to-right or right-to-left, across the symbol to be used for reading the two-dimensional symbol.

SUMMARY OF THE INVENTION

Objects of the Invention

Accordingly, it is a general object of this invention to align the scan lines in a raster pattern, especially for use in an image projection arrangement that projects a sharp and clear, two-dimensional color image on a display screen.

Another object of this invention is to synchronize a data signal on a pattern of odd and even scan lines with movement of a scan mirror operative for sweeping a light beam along each scan line.

Still another object of this invention is to eliminate image calibration in image projection arrangements.

Yet another object of this invention is to achieve near perfect alignment between odd and even scan lines of a projected image.

An additional object is to provide a miniature, compact, lightweight, and portable color image projection arrangement useful in many instruments of different form factors.

FEATURES OF THE INVENTION

In keeping with these objects and others which will become apparent hereinafter, one feature of this invention resides, briefly stated, in an arrangement for, and a method of, synchronizing a data signal, such as a video signal, on a pattern of odd and even scan lines with movement of a scan mirror operative for sweeping a light beam, especially a laser beam, along each scan line.

The arrangement includes a drive for periodically oscillating the scan mirror between end positions at opposite ends of a center position. For example, a series of drive pulses is periodically applied to the drive to cause the scan mirror to oscillate at a mechanical resonant frequency, e.g., 30 kHz.

The arrangement also includes an illuminator, e.g., a light emitting diode or a laser, for transmitting a first light pulse to the scan mirror for reflection therefrom during sweeping of each odd scan line, and for transmitting a second light pulse to the scan mirror for reflection therefrom during sweeping of each even scan line. The first and second light pulses for each adjacent pair of odd and even scan lines have the same time duration and, ideally, are transmitted in the middle of each scan line.

The arrangement further includes a detector, e.g., a photodetector, for detecting light reflected off the scan mirror by the first and second light pulses to generate first and second detected signals, respectively. The illuminator and the detector are preferably located at a same side of the scan mirror, and the detector monotonically generates each detected signal between the end positions of the mirror.

A processor is operatively connected to the drive, the illuminator and the detector and is operative for processing the first and second detected signals to determine the center position of the mirror for each adjacent odd and even scan line, and for controlling the drive to align the center position for each odd scan line with the center position for each adjacent even scan line for alignment of the pattern of scan lines. In the preferred embodiment, the processor includes an odd integrator for integrating each first detected signal to produce a first integrated signal, an even integrator for integrating each second detected signal to produce a second integrated signal, and a controller, for example, a microprocessor, for comparing the integrated signals, and for determining the center position of the mirror for each adjacent odd and even scan line when the integrated signals are the same. Once the center position of the mirror for each scan line is known, then the end positions of the mirror for each scan line are known. The positions of all the scan lines being known, the scan lines are all aligned with one another.

In the case of an image projection arrangement, each scan line has a number of pixels, and the processor causes selected pixels to be illuminated, and rendered visible, on the scan lines in response to the video signal to produce an image. With the alignment of all the scan lines, no offset images are produced and, hence, no calibration is necessary.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement for installation in the instrument of FIG. 1;

DETAILED DESCRIPTION OF THE PREFERRED EMBODIMENTS

Figure 3:
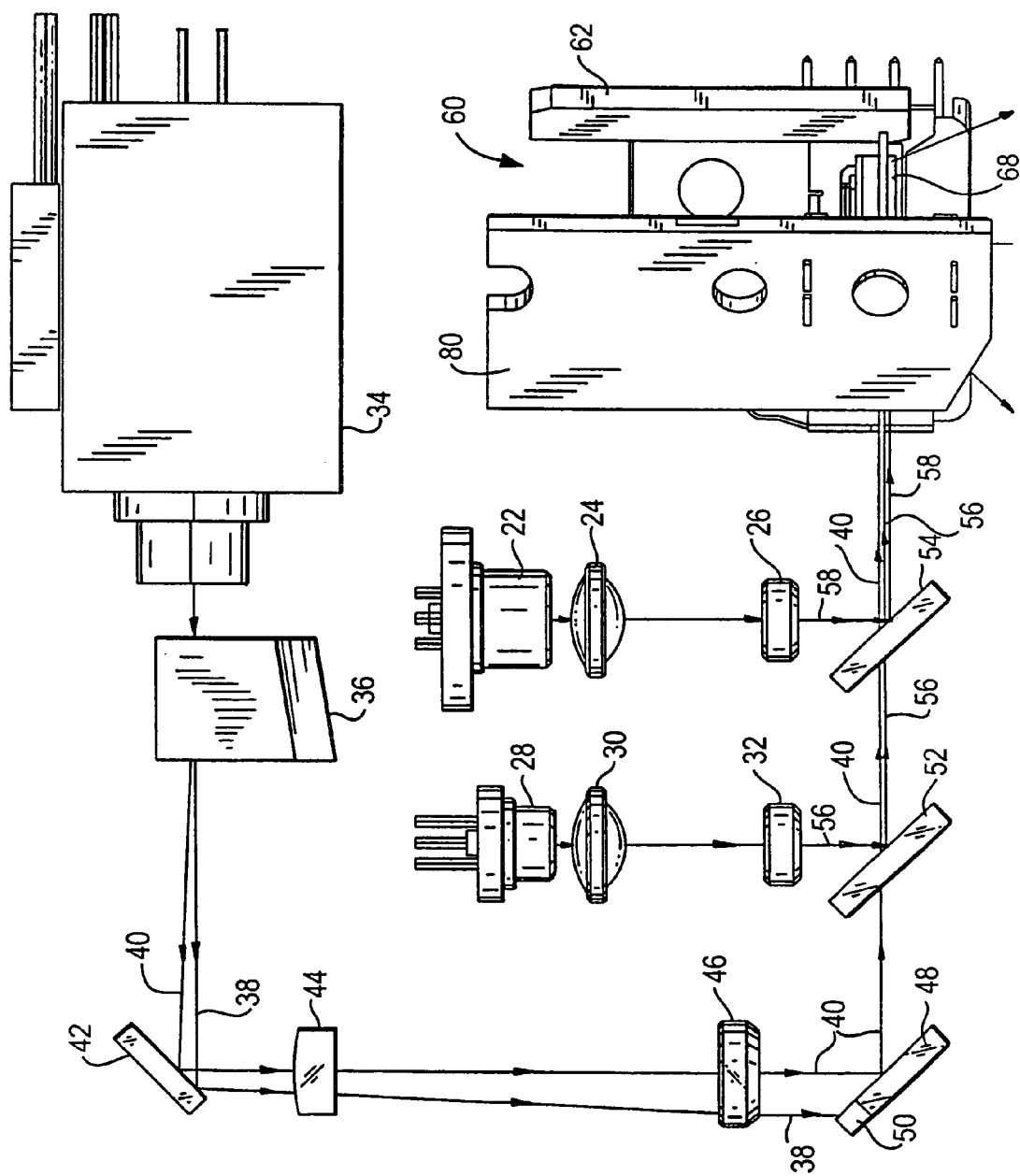
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a semiconductor laser 22 which, when energized, emits a bright red laser beam at about 635–655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475–505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
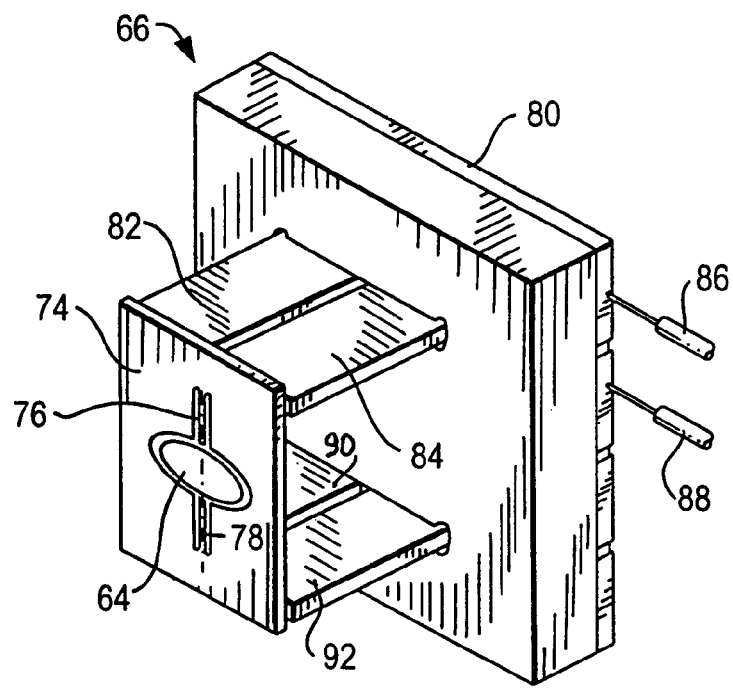
FIG. 4 is a perspective front view of an inertial drive for use in the arrangement of FIG. 2.
Figure 5:
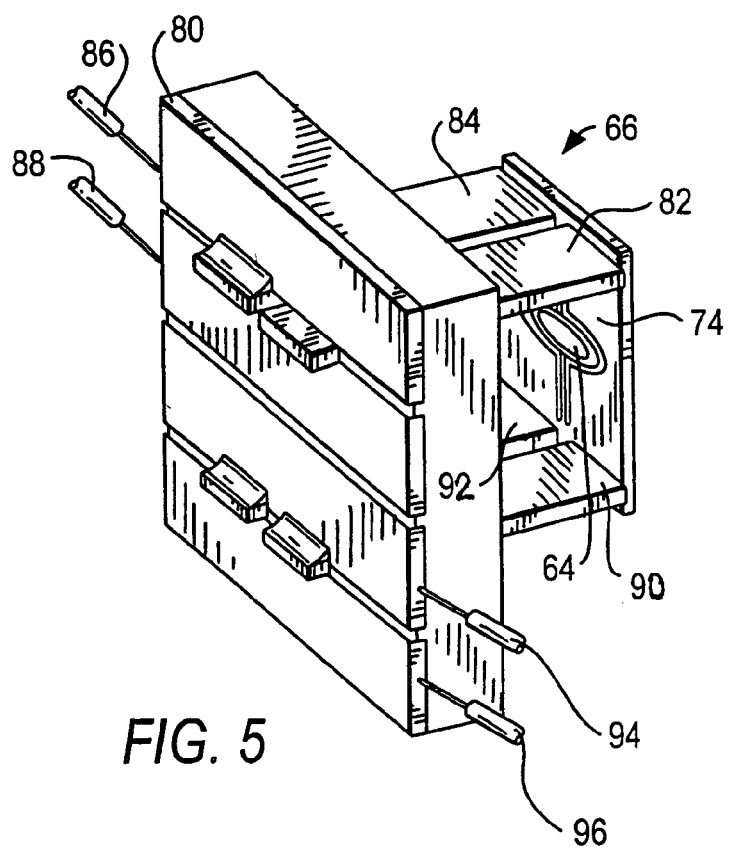
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4–5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown in FIGS. 4–5).

Alternately, instead of using piezo-electric transducers 90, 92 for feedback, magnetic feedback can be used, where a magnet is mounted on the back of the high-speed mirror, and an external electromagnetic coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel odd and even scan lines from which the image is constructed. Each scan line has a number of pixels. The image resolution is preferably XGA quality of 1024× 768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
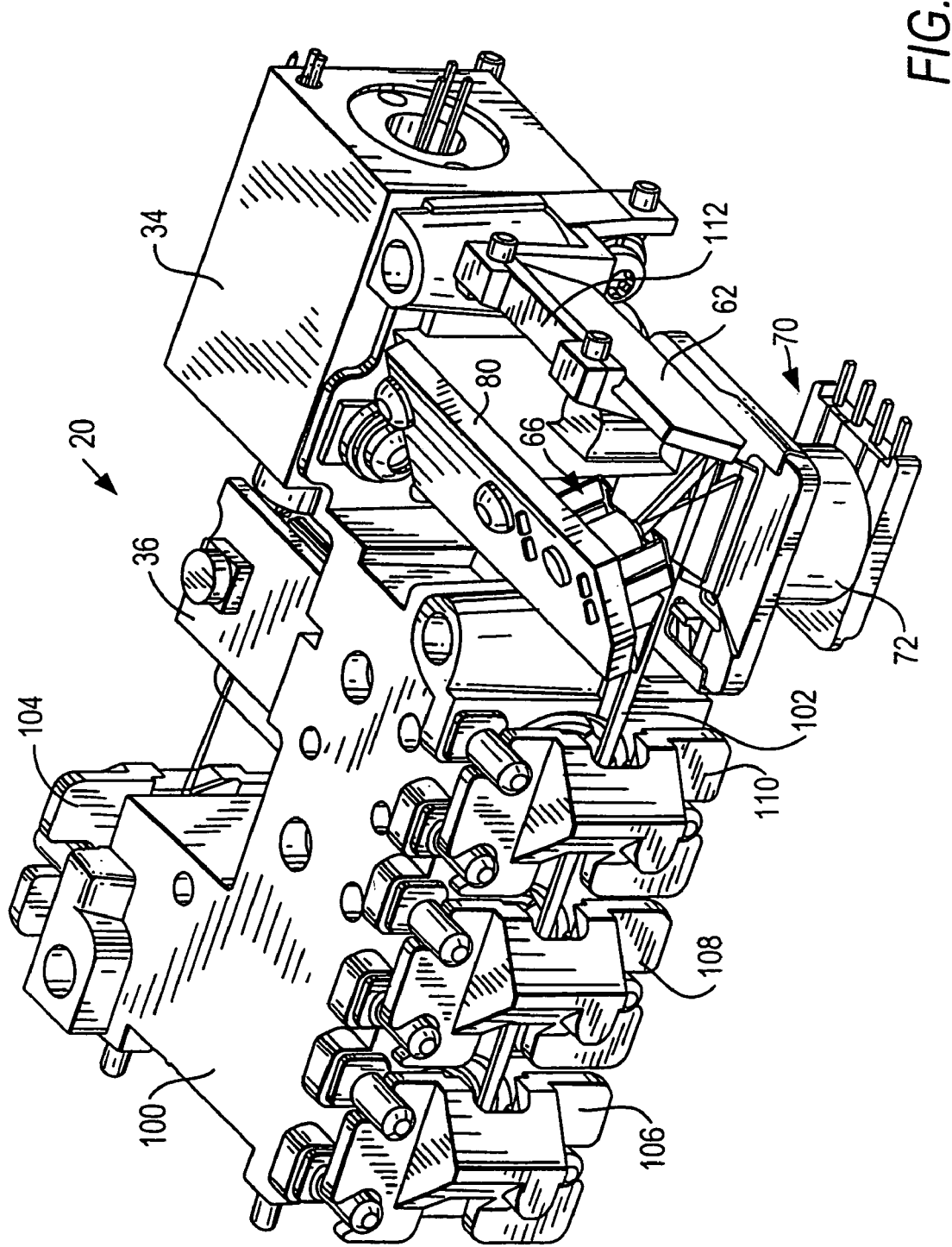
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48 (see FIG. 2), filters 52, 54 (see FIG. 2) and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive odd and even scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
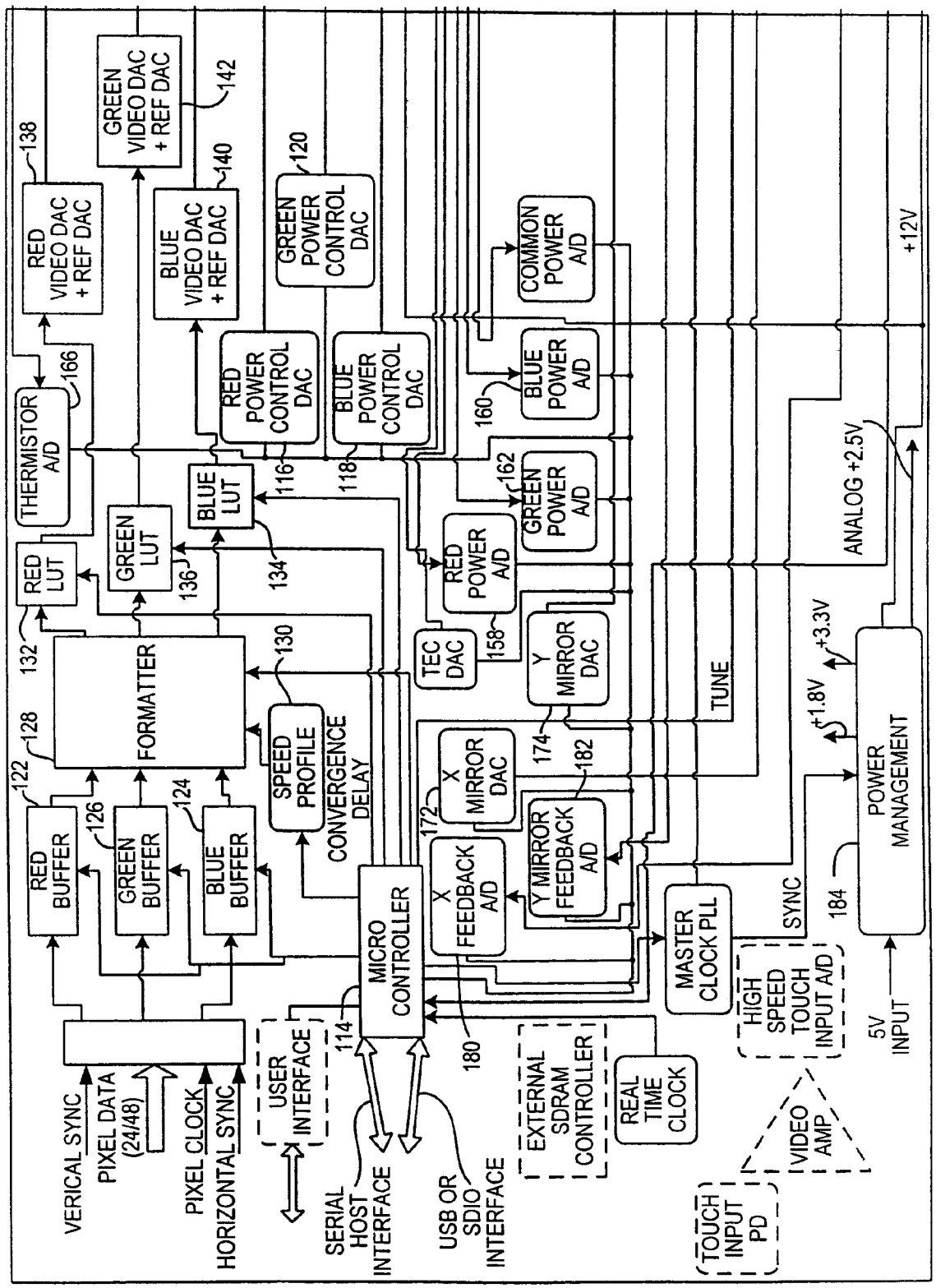
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
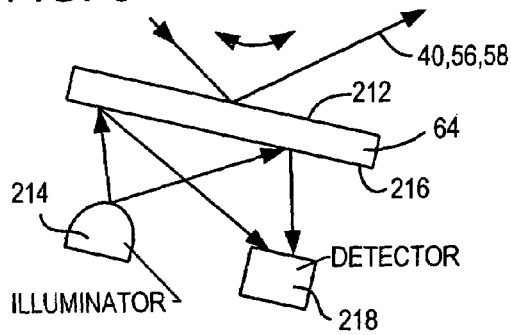
FIG. 8 is a diagrammatic view of part of a synchronization arrangement in accordance with this invention.
Figure 9:
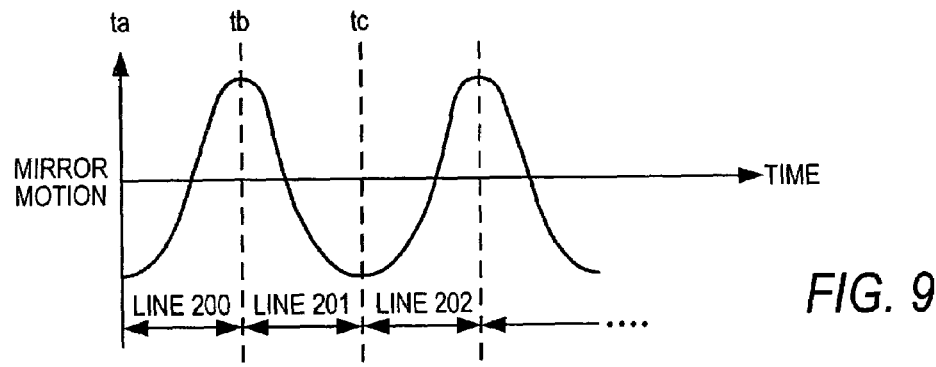
FIG. 9 is a graph of mirror motion versus time.

In accordance with this invention, the scan lines in the raster pattern 18 are to be aligned with one another. For ease of description, the scan lines swept from left-to-right are described as odd lines, and the scan lines swept from right-to-left are described as even lines, although the reverse could be true. Each scan line is swept by the scan mirror 64 shown in isolation in FIG. 8 for sweeping the composite laser beam 40, 56, 58 incident thereon from a front reflecting surface 212 toward a display screen. The scan mirror 64 is periodically driven at its mechanical resonant frequency by the driver 168, and FIG. 9 depicts the sinusoidal oscillation of the scan mirror 64 plotted as angular displacement as a function of time. For representative even line 200, the time $t_a$ indicates one end position of the mirror 64, while the time $t_b$ indicates the opposite end position of the mirror 64. Analogously, for the representative odd line 201, the times $t_b$ and $t_c$ represent the end positions of the mirror 64.

Figure 10:
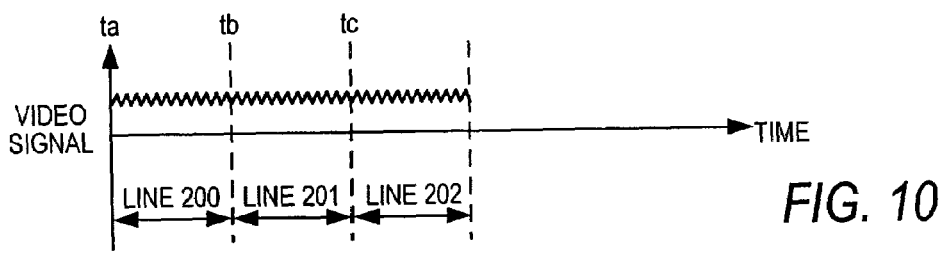
FIG. 10 is a graph of a video signal correctly converged on representative scan lines.

FIG. 10 depicts the aforementioned video signal on representative scan lines 200, 201 when they are aligned. Thus, the video signal for line 200 starts at $t_a$ and ends at $t_b$, while the video signal for line 201 starts at $t_b$ and ends at $t_c$.

Figure 11:
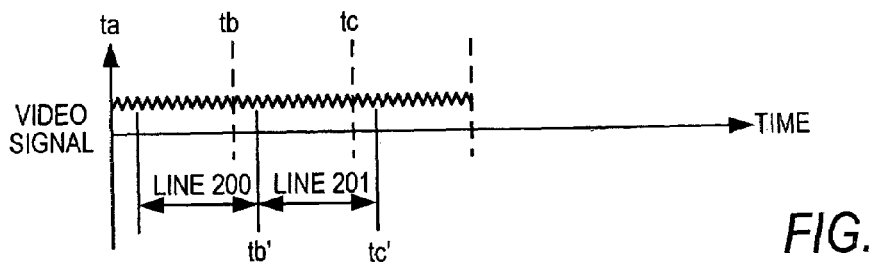
FIG. 11 is a graph of a video signal incorrectly converged on representative scan lines.

FIG. 11 depicts the video signal when there is misalignment between the adjacent even and odd scan lines 200, 201. Now, the video signal for line 200 does not end at $t_b$, but ends later at $t_d$. Also, the video signal for line 201 does not end at $t_c$, but ends later at $t_e$.

Figure 12:
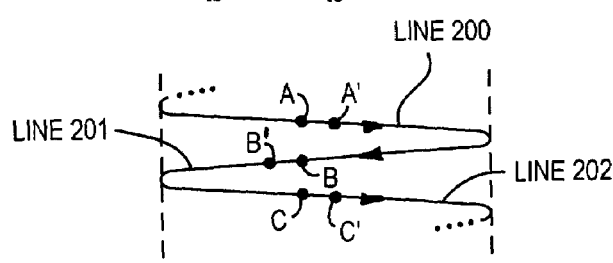
FIG. 12 is a diagrammatic view of correctly converged pixels and incorrectly converged pixels on a display screen.

FIG. 12 is a schematic diagram depicting pixel position on the display screen. The center position of the mirror that sweeps scan lines 200, 201, 202 is respectively designated as points A, B, C and which are in vertical alignment, also called correct convergence. However, if the center position of the mirror is displaced from the middle of scan lines 200, 201, 202, as designated by points A', B', C', then there is vertical misalignment, also called incorrect convergence. This invention is directed to insuring correct convergence among all the scan lines of the raster pattern.

Figure 13:
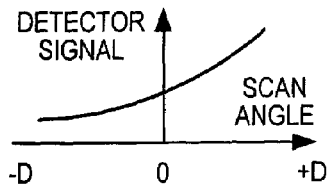
FIG. 13 is a graph of the response characteristic of the detector as a function of scan angle of the mirror.

In accordance with this invention, an illuminator 214, such as a light emitting diode or a laser, is positioned to face a rear reflecting surface 216 of the scan mirror 64, and is operative for transmitting light pulses, as described below, for reflection therefrom and for detection by a detector 218, such as a photodiode. The illuminator 214 and the detector 218 are positioned on the same side of the mirror 64. The detector 218 has a monotonic response characteristic as depicted in FIG. 13 in which the detector detects the weakest signal at one end position (scan angle=−D) of the mirror 64, a somewhat stronger signal at a center position (scan angle=zero degrees) of the mirror 64, and the strongest signal at the opposite end position (scan angle =+D) of the mirror 64.

Figure 14:
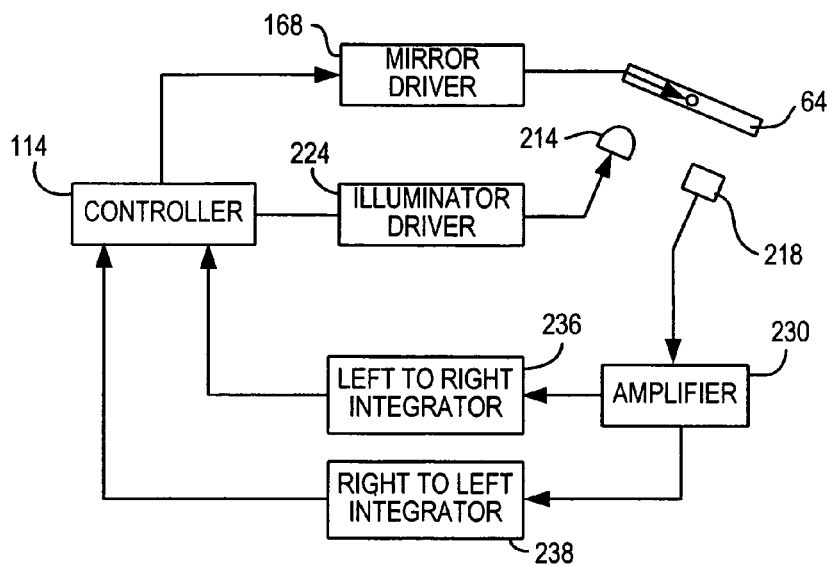
FIG. 14 is an electrical schematic of the synchronization arrangement in accordance with this invention.
Figure 15:
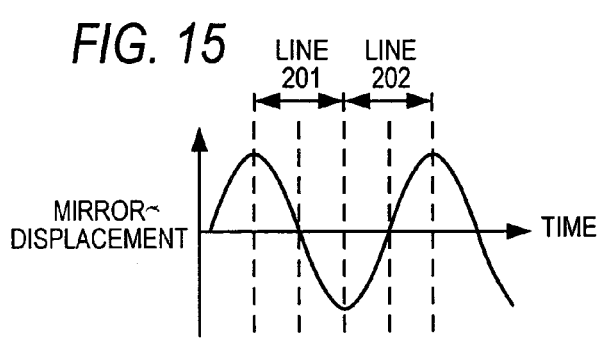
FIG. 15 is a graph of mirror displacement versus time.
Figure 16:
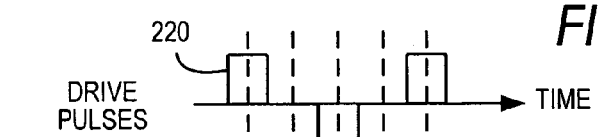
FIG. 16 is a graph of the drive pulses used to drive the mirror.

FIG. 14 depicts a preferred embodiment of the invention, in which the aforementioned controller 114 via the mirror driver 168 drives the scan mirror 64 into resonance. FIG. 15 depicts the mirror displacement as a function of time when the mirror is oscillating at its mechanical resonant frequency. The controller 114 generates a periodic drive signal, advantageously the series of drive pulses depicted in FIG. 16, in which a positive drive pulse 220 is generated at one end position of the mirror, and a negative drive pulse 222 is generated at the opposite end position of the mirror. Other periodic signals could be employed.

Figure 17:
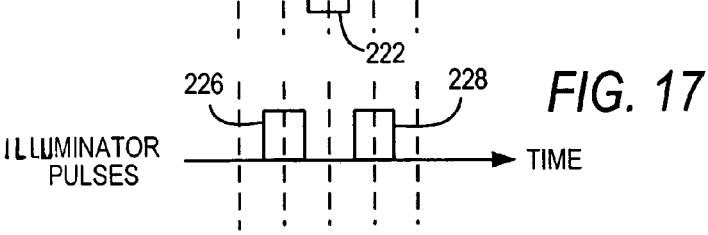
FIG. 17 is a graph of the illuminator pulses used to modulate the illuminator.

The controller 114 is also operative via illuminator driver 224 to modulate the illuminator 214 with first and second light pulses 226, 228, as shown in FIG. 17. The light pulses are spaced apart by 180° of phase and have the same time duration. The first light pulse 226 is transmitted in the middle of the representative odd scan line 201, whereas the second light pulse 228 is transmitted in the middle of the next adjacent representative even scan line 202.

Figure 18:
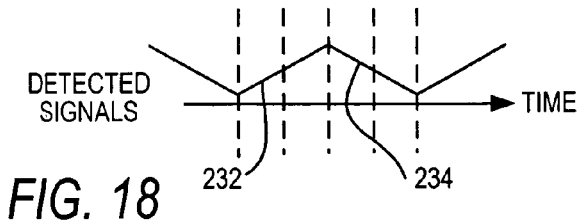
FIG. 18 is a graph of the detected signals detected by the detector.

FIG. 18 depicts the response of the detector 218. During scan line 201, as the beam is being swept from left-to-right, the signal 232 detected by the detector rises in accordance with the monotonic response characteristic of FIG. 13. During scan line 202, as the beam is being swept from right-to-left, the signal 234 detected by the detector falls, again in accordance with the monotonic response characteristic of FIG. 13.

Figure 19:
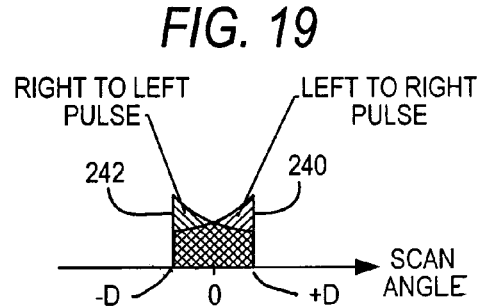
FIG. 19 is a graph of the intergrated signals versus scan angle of the mirror when the integrated signals match at a central position of the mirror.

The detected signals 232, 234 are conducted to an amplifier 230. A left-to-right integrator 236 integrates the signal 232 to produce a left-to-right integrated pulse 240 in FIGS. 19–20. A right-to-left integrator 238 integrates the signal 234 to produce a right-to-left integrated pulse 242 in FIGS. 19–20.

Figure 20:
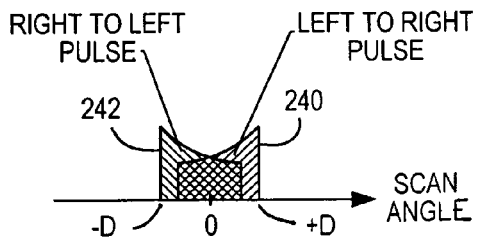
FIG. 20 is a graph analogous to FIG. 19, but depicting a mismatch of the integrated signals at the central position of the mirror.

The integrated pulses 240, 242 are fed to the controller 114. If the light pulses 226, 228 (FIG. 17) are exactly in the middle of representative adjacent scan lines 201, 202 (FIG. 15), then the integrated pulses 240, 242 (FIG. 19) will be the same at the center position (zero degrees) of the mirror, because the mirror 64 will sweep exactly the same angle during both light pulses 226, 228, although in opposite directions. If the light pulses 226, 228 (FIG. 17) are not exactly in the middle of representative adjacent scan lines 201, 202 (FIG. 15), then the integrated pulses 240, 242 (FIG. 20) will not be the same at the center position of the mirror. For example, FIG. 20 depicts that the integrated pulses 240, 242 are offset at the center position of the mirror. The controller 114 detects this offset condition, and controls the mirror driver 168 to shift the phase of the drive pulses 220, 222 to restore the symmetry of the integrated pulses 240, 242 at the center position. In other words, the scan mirror is forced to assume a precisely known phase position. Once the center position of the mirror is known, its end positions are known. The mirror 64 is scanned at a constant speed during both its odd and even sweeps. Each scan line has the same number of pixels. Hence, the pixels on each even scan line are aligned with the pixels on each odd scan line. The scan lines are thus in correct convergence, and no offset images are produced which must be calibrated as in the prior art.

As previously noted, the time duration of light pulses 226, 228 are the same for each cycle of the scan mirror. This time duration need not be the same for subsequent cycles, and preferably changes randomly from cycle to cycle. In other words, the time duration for the light pulses of each cycle is the same, but is different for each subsequent cycle. This feature is intended to obviate errors where, for example, dust may accumulate on the rear reflecting surface 216 of the mirror 64, thereby causing spikes or noise at unpredictable locations on the detector response curve of FIG. 13. Such spikes can affect the matching of the integrated pulses 240, 242 at the central position of the mirror and, hence, by randomly changing the time duration of the pulses 226, 228 for subsequent cycles, such spikes can be ignored over a large enough number of cycles.

It will be understood that each of the elements described above, or two or more together, also may find a useful application in other types of constructions differing from the types described above.

While the invention has been illustrated and described as an arrangement for, and a method of, synchronizing a video signal with movement of a scan mirror, especially for use in a color image projection system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

The invention claimed is:

1. An arrangement for synchronizing a data signal on a pattern of odd and even scan lines with movement of a scan mirror operative for sweeping a light beam along each scan line, the arrangement comprising:

a) a drive for periodically oscillating the scan mirror between end positions at opposite ends of a center position;

b) an illuminator for transmitting a first light pulse to the scan mirror for reflection therefrom during sweeping of each odd scan line, and for transmitting a second light pulse to the scan mirror for reflection therefrom during sweeping of each even scan line, the first and second light pulses of adjacent odd and even scan lines being of a same time duration;

c) a detector for detecting light reflected off the scan mirror by the first and second light pulses to generate first and second detected signals, respectively; and d) a processor operatively connected to the drive, the illuminator and the detector, for processing the first and second detected signals to determine the center position of the mirror for each adjacent odd and even scan line, and for controlling the drive to align the center position for each odd scan line with the center position for each adjacent even scan line for alignment of the pattern of scan lines.

2. The arrangement of claim 1, and a laser for emitting a laser beam as the light beam, and wherein each scan line has a number of pixels, and wherein the processor includes a controller for energizing the laser to cause selected pixels to be illuminated, and rendered visible, on the scan lines to produce an image in response to a video signal.

3. The arrangement of claim 2, wherein the scan mirror has a first reflecting surface on which the laser beam is incident, and a second reflecting surface on which the light pulses are incident.

4. The arrangement of claim 3, wherein the illuminator is a modulatable light source, and wherein the detector is a photodetector, and wherein the light source and the photodetector are located at a same side of the scan mirror and face the second reflecting surface thereof.

5. The arrangement of claim 4, wherein the photodetector monotonically generates each detected signal between the end positions of the scan mirror.

6. The arrangement of claim 1, wherein the drive generates a periodic mirror drive signal for periodically oscillating the scan mirror.

7. The arrangement of claim 1, wherein the processor includes an odd integrator for integrating each first detected signal to produce a first integrated signal, an even integrator for integrating each second detected signal to produce a second integrated signal, and a controller for comparing the integrated signals and for determining the center position of the mirror for each adjacent odd and even scan line when the integrated signals are the same.

8. The arrangement of claim 1, wherein the processor includes a controller operative for maintaining the time duration of the first and second light pulses of a first pair of adjacent odd and even scan lines to be the same, and for changing the time duration of the first and second light pulses of a second pair of adjacent odd and even scan lines to be different from that of the first pair.

9. A method of synchronizing a data signal on a pattern of odd and even scan lines with movement of a scan mirror operative for sweeping a light beam along each scan line, the method comprising the steps of:

a) periodically oscillating the scan mirror between end positions at opposite ends of a center position;

b) transmitting a first light pulse to the scan mirror for reflection therefrom during sweeping of each odd scan line, and transmitting a second light pulse to the scan mirror for reflection therefrom during sweeping of each even scan line, the first and second light pulses of adjacent odd and even scan lines being of a same time duration;

c) detecting light reflected off the scan mirror by the first and second light pulses to generate first and second detected signals, respectively; and d) processing the first and second detected signals to determine the center position of the mirror for each adjacent odd and even scan line, and aligning the center position for each odd scan line with the center position for each adjacent even scan line for alignment of the pattern of scan lines.

10. The method of claim 9, and emitting a laser beam as the light beam, and wherein each scan line has a number of pixels, and causing selected pixels to be illuminated, and rendered visible, on the scan lines to produce an image in response to a video signal.

11. The method of claim 10, wherein the scan mirror has a first reflecting surface on which the laser beam is incident, and a second reflecting surface on which the light pulses are incident.

12. The method of claim 9, wherein the detecting step is performed by monotonically generating each detected signal between the end positions of the scan mirror.

13. The method of claim 9, wherein the processing step includes integrating each first detected signal to produce a first integrated signal, integrating each second detected signal to produce a second integrated signal, and comparing the integrated signals and determining the center position of the mirror for each adjacent odd and even scan line when the integrated signals are the same.

14. The method of claim 9, and maintaining the time duration of the first and second light pulses of a first pair of adjacent odd and even scan lines to be the same, and changing the time duration of the first and second light pulses of a second pair of adjacent odd and even scan lines to be different from that of the first pair.

* * * * *